2,980,652
UNSATURATED DERIVATIVES OF N-(OMEGA-AMINOALKYL) - 1,3-CYCLODIAZOLIDIN-2-ONES AND COPOLYMERS THEREOF

Sidney Melamed, Philadelphia, and Louis C. Souder, Levittown, Pa., assignors to Rohm & Haas Company, Philadelphia, Pa., a corporation of Delaware
No Drawing. Filed Sept. 19, 1958, Ser. No. 761,952
18 Claims. (Cl. 260—77.5)

This invention relates to unsaturated derivatives of N-(omega-aminoalkyl)-1,3-cyclodiazolidin-2-ones, polymers thereof, and methods of preparation. The invention is particularly concerned with new compounds as generically defined above which are susceptible to both addition polymerization by virtue of their unsaturation and to condensation reactions by virtue of nitrogenous heterocyclic rings therein. Polymers obtained from such compounds and the methods of making the compounds and the polymers are also part of the invention herein.

One of the primary objects of the present invention is to provide novel compounds which are capable of both addition polymerization and condensation reactions. Another object of the invention is to provide novel polymers which contain heterocyclic rings providing therein capacity for condensation by heat alone or by the application of external reagents to form cross-linked products of insoluble and infusible character. Another object of the present invention is to provide novel polymeric compositions which have outstanding adhesion toward various substrates and particularly metals, glass, and plastics. Other objects and advantages of the invention will be apparent from the description thereof hereinafter.

The new compounds of the present invention may be named in various ways. Besides the generic designation mentioned hereinabove, they may be represented as N-[omega - (1,3 - cyclodiazolidin - 2 - onyl) - alkyl] - substituted unsaturated amic acids, their esters and cyclic imides, and polymers thereof. Specifically, the most important group of compounds in accordance with the invention are N-substituted maleamic, chloromaleamic, fumaramic, itaconamic, mesaconamic, and citraconamic acids, the nitrogen atom of which is attached to the radical

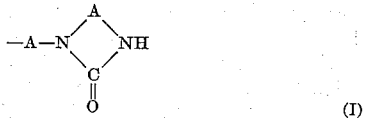

(I)

The N-substituted maleamic acids and esters are typical of the compounds of the present invention, and have the generic formula

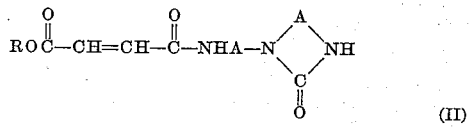

(II)

where R is selected from the group consisting of H and n-alkyl having 1 to 4 carbon atoms, and A is an alkylene group having 2 to 3 carbon atoms, and having at least two carbon atoms extending in a chain between the adjoined N atoms.

The internal cyclic imides obtained from the maleamic acids have the generic formula

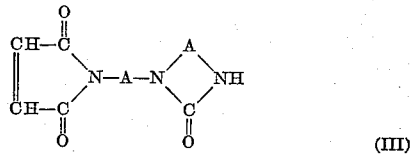

(III)

where A is as defined above.

When considered from the end of the molecule containing the radical having the Formula I above, the compounds are substituted 2-imidazolidinones or substituted hexahydro-2-pyrimidinones depending upon whether A has two carbon atoms or three carbon atoms respectively in the ring.

Various ways may be employed for producing the amic acids, their esters, and their cyclic imides. Polymers thereof may be obtained as explained hereinafter either by polymerization of the monomers or reaction with polymers of maleic anhydride, itaconic anhydride, or citraconic anhydride.

One preferred way of producing monomers of the present invention is to react maleic anhydride, chloromaleic anhydride, itaconic anhydride, mesaconic anhydride, or citraconic anhydride with an amine of the Formula V given in the following equation, wherein A is as defined hereinabove and maleic anhydride (Formula IV) is used as representative of the anhydrides:

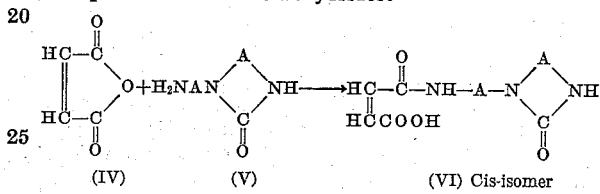

(IV)     (V)     (VI) Cis-isomer

This reaction may be effected in an inert solvent such as chloroform, carbon tetrachloride, methylene chloride, toluene, xylenes, dioxane, or tetrahydrofurane. While the ratio of proportions of the anhydride to the amine may be varied widely, it is most practical to employ approximately equimolar proportions since that is the proportion in which they react. The reaction may be effected at room temperature up to 60° C. Preferably, the temperature is not above 40° C. No catalyst is necessary but if desired, a trace of a strong acid catalyst such as para-toluene sulfonic acid may be added to accelerate the reaction. The reaction is rapid and it is generally advisable to add the amine gradually to a solution or suspension of the anhydride in the inert solvent. The time required for reaction will, of course, depend upon the quantities to be reacted and the rate at which the amine can be added without exceeding the reaction temperatures mentioned above with the cooling equipment that may be available. Generally, a period of 1 to 8 hours is adequate for most practical operations. The product generally precipitates as an insoluble material and in that case is filtered, washed with the same solvent as used during the reaction, and if desired, may be recrystallized from solution in hot water or alcohols such as methyl, ethyl, or isopropyl alcohol. Instead of filtering and washing, the solvent may be evaporated off, particularly if the product is not completely insoluble therein.

The esters of the substituted amic acids thereby obtained may be produced by reacting the product obtained in accordance with the preceding paragraph with excess alcohol. Methanol, ethanol, propanol, i-propanol, and n-butanol may be employed; and the reaction may be effected in the presence of a strong acid catalyst such as sulfuric acid, para-toluene sulfonic acid, and so on. The solvent is stripped from the reaction medium to leave the product; and if desired, the catalyst may be neutralized.

The cyclic imides are obtained from the amic acids, such as those of Formula VI hereinabove, by dissolving the amic acid product in an inert solvent such as any of those mentioned in connection with the reaction of the anhydride with the amine and then treating the solution with a dehydrating agent. For example, the solution may simply be heated to split out water from the amic acid, such heating being effected at a temperature of 150° to 300° C. For this purpose, a high-boiling inert solvent such as mineral oil is preferred. The product precipitates and may be isolated by filtration and recrystallization from solution in hot water or in alcohols. Alternatively, acetic anhydride and a trace of some strong acid may be introduced into the solution and the reaction mixture heated to 100° to 125° C. The acetic anhydride dehydrates the amic acid to form the cyclic amide and is converted to acetic acid. The solvent and acetic acid are then evaporated under a vacuum and the product may be repurified by recrystallization in solution such as in hot water or hot alcohols. A preferred method of dehydrating is effected by introducing into the solution of the amic acid a dialkyl or dicyclohexyl carbodiimide of the following formula:

$$R°-N=C=N-R° \qquad (VII)$$

where $R^0$ is selected from the group consisting of cyclohexyl and alkyl having from 1 to 8 carbon atoms. In this case, the urea by-products precipitate and can be filtered off. The cyclic imide such as that of Formula III when the maleamic acid derivative is used may be obtained by stripping off the solvent in vacuum.

An alternative method for producing the esters of the present invention is to react a half-ester chloride of fumaric acid, maleic acid, chloromaleic acid, itaconic acid, mesaconic acid, or citraconic acid with an amine of the Formula V hereinabove. The reaction, using the half-ester chloride of fumaric acid (Formula VIII) as a representative ester, is represented by the following equation:

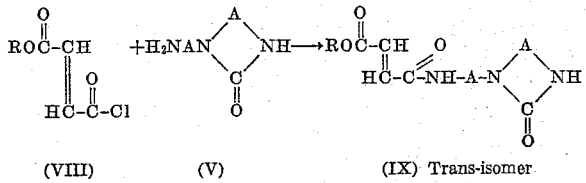

(VIII)      (V)      (IX) Trans-isomer

Whereas the fumaric acid half-ester chloride produces a trans-isomer (Formula IX), a cis-isomer is obtained from the half-ester chloride of maleic acid. To effect this reaction, the amine of Formula V is dissolved in an inert solvent such as any of those mentioned hereinabove and the half-ester chloride is added gradually while maintaining the temperature with cooling in the range of about 0° to 20° C. The proportion of the amine employed is two mols per mol of the half-ester chloride. The reaction occurs substantially as rapidly as the half-ester chloride is added and the excess amine picks up the hydrogen chloride produced by the main reaction. The amine hydrochloride precipitates out and can be filtered off after which the inert solvent is stripped under a vacuum to leave the product. Alternatively, the amine hydrochloride may be extracted with water and the reaction medium washed with dilute aqueous hydrochloric acid to remove unreacted amine, then washed with dilute sodium carbonate and finally with water. The organic layer may then be dehydrated with a desiccant such as sodium sulfate or magnesium sulfate after which the dehydrating agent may be filtered off.

The amic acids, esters thereof, and cyclic imides obtained are generally not readily polymerizable by themselves to produce homopolymers except in the case of those derived from itaconic anhydride which do homopolymerize. Surprisingly, however, all of the monomers are copolymerizable with a wide variety of vinyl and acrylic monomers have one or more $CH_2=C=$ groups by any free-radical initiator system. Using conventional free-radical initiators including peroxides, persulfates, and azo compounds, polymerization may be effected by bulk, solution, emulsion, or suspension techniques. The molecular weights depend upon the comonomer to a great extent. Polymers having molecular weights of 50,000 to 200,000 are readily obtainable by solution procedures, whereas higher molecular weights up to several million are obtainable by bulk, emulsion, and suspension polymerization.

Solution polymerization may be effected in such solvents as water, dimethylformamide or other of the solvents mentioned above in which the compounds of Formula I and any comonomers that may be used are suitably soluble. Although the compounds of Formula I have generally an appreciable solubility in water, these compounds may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.1% to 0.5% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion of polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers includes higher alkyl pyridinium salts such as lauryl pyridinium chloride (octylbenzyl)trimethylammonium chloirde, and so on.

Examples of vinylidene or monoethylenically unsaturated compounds that may be copolymerized with the compounds of the invention include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

The monomeric derivatives of itaconic anhydride form a special class of compounds of this invention in that each may be homopolymerized to give polymers varying in molecular weight from 10,000 to more than 500,000 if desired. The homopolymers derived from the itaconamic acid, the imide or the methyl ester thereof are water-soluble. As such they are useful as warp sizes, wet-strength resins in paper, thickeners, and flocculants. However, copolymers containing from about 0.5% to 20% by weight or more of the derivatives of itaconic anhydride with various comonomers are adapted to provide valuable coating materials which may be pigmented or not, and may contain plasticizers or not, and in the case of emulsion copolymers, they are adapted to provide valuable water-base paints. Examples of plasticizers that may be used are dibutyl phthalate, butyl benzyl phthalate, triphenyl phosphate, di-n-hexyl adipate, methyl abietate, ethyl phthalyl ethyl glycolate, tributyl phosphate, di-isooctyl phthalate, and glycerol monoricinoleate. Examples of pigments include carbon black, titanium dioxide, ultramarine blue, lead chromate, copper phthalocyanine blues and greens, zinc chromate, zinc oxide, clays, calcium carbonate, lead carbonate, and barium sulfate, iron oxides, toluidines, Prussian Blue, Chrome Yellow, Para Red Toners, Lithol Red, Cadmium Red, and Chromium Oxide.

Copolymers containing units of the amic acids, their esters, and cyclic imides may be obtained by first preparing a copolymer of a maleic anhydride, itaconic anhydride, or citraconic anhydride and reacting such copolymers with an amine of Formula V hereinabove. This reaction may be represented as follows using the copolymeric units of maleic anhydride (Formula X) as representative of the anhydrides:

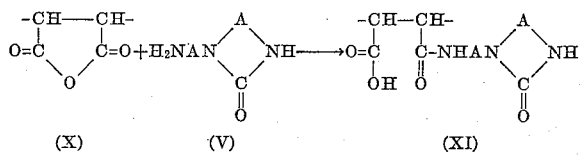

The proportion of amine employed depends upon the amount of anhydride units in the copolymer which it is desired to convert into derivative units of the present invention. The proportion, in the copolymers, of units of the amic acids, their esters, and cyclic amides of the present invention may vary from 0.1% by weight to 50% by weight of the copolymer, but for most practical purposes the range is from 0.1% to 20% by weight of such. With excess amine present, the amine salt of the acid product may also be produced.

As the anhydride unit containing polymers which may be used as starting materials in this reaction with an amine of Formula V, there may be employed homopolymers of itaconic anhydride and copolymers of maleic anhydride, itaconic anhydride, or citraconic anhydride with other monomers containing at least one monoethylenically unsaturated grouping of the formula $CH_2=C=$. Examples of comonomers which may be present in the copolymers of the anhydrides include styrene, ethylene, propylene, isobutylene, butadiene, vinyl esters of fatty acids having from 2 to 18 carbon atoms such as vinyl acetate itself, vinyl chloride, vinylidene chloride, chlorotrifluoroethylene, tetrafluoroethylene, acrylonitrile, methacrylonitrile, esters of acrylic acid, methacrylic acid, or itaconic acid such as the esters with cyclohexanol, benzyl alcohol, phenol, and fatty alcohols having from 1 to 18 carbon atoms including methanol, ethanol, propanol, isopropanol, n-butanol, octanol, dodecanol, and octadecanol, acrylamide, methacrylamide, and N-substituted acrylamides such as N,N-dimethyl-acrylamide, N,N - dibutyl - methacrylamide, N - ethyl - methacrylamide, vinyl toluenes, and α-methylstyrene. The proportions of the comonomers may be from about 1 to 99.9%. The entire proportion of anhydride units may be converted to the amic acid or only a portion thereof may be so converted leaving anhydride units in the final copolymer containing units of amic acid type.

The reaction of the anhydride unit containing polymer may be effected by dissolving the polymer in an inert solvent, such as toluene, xylenes, turpentine, dimethyl formamide, acetamide, mono-alkyl ethers of ethylene glycol, such as a mono-methyl, mono-ethyl or mono-butyl ether thereof, and then adding the amine while maintaining the temperature of the reaction medium at about 40° to 110° C. When temperatures in the lower part of this range are employed, ester solvents such as ethoxyethyl acetate may be employed without encountering substantial production of by-products. When the anhydride containing copolymer also contains ester units which are sensitive to aminolysis by the amine of Formula V, temperatures in the lower portion of the range specified should be employed. Thus, with methyl acrylate or vinyl acetate, temperatures of 40° to 50° C. should be employed with longer periods of time such as up to eight hours to minimize aminolysis of the acrylate units. A higher acrylate, such as ethyl acrylate, propyl acrylate, and butyl acrylate, is progressively more resistant so that higher temperatures may be employed and methyl methacrylate is fairly unreactive so that a temperature of 100° C. or even higher may be employed with a copolymer containing units thereof. In general, the lower temperature of reaction is preferred to reduce discoloration as well as to avoid side reactions when the copolymer contains ester units or an ester solvent is employed as the reaction medium.

The copolymers containing from 0.1% to 20% by weight of the derivative units of the present invention may be of rubbery to rigid solid character and frequently are quite similar in physical properties to the polymers from which they are obtained by the aminolysis reaction described hereinabove. Solutions of such copolymers have essentially the same or higher viscosity for a given concentration in a given solvent as those of the initial copolymer from which they are obtained by aminolysis. Likewise, the solubility depends primarily on the comonomer and is generally quite similar to the solubility of the initial polymers from which they are derived.

Copolymers of the present invention are adapted to be converted to insoluble and infusible state through cross-linking reactions effected either by heating the copolymer alone or by reaction with other reactants such as aldehydes and particularly formaldehyde or compounds revertible thereto. Thus, coatings may be formed from solutions of the copolymers or from aqueous dispersions of emulsion copolymers of the present invention and the films converted to insoluble and infusible condition by heating such as to temperatures of 110° C. to 300° C. or by treatment with aldehydes, polyepoxides, polyisocyanates, or anhydrides of polycarboxylic acids. By virtue of the reactivity of the heterocyclic ring in the units of the copolymers of the present invention, extremely useful products of thermosetting character may be obtained using the copolymers alone or in admixture with other resin materials. Thus, the copolymers may be mixed with various aminoplasts or phenolics including condensates of phenol and formaldehyde, urea and formaldehyde, N,N'-ethyleneurea and formaldehyde, melamine and formaldehyde, and their alkylation products with lower alcohols having from 1 to 4 carbon atoms. They may also be included in thermosetting casting materials such as with methyl methacrylate and with polyester compositions derived from unsaturated dicarboxylic acids, such as maleic esters of ethylene glycol with or without other unsaturated monomers such as styrene, methyl methacrylate, and so on. Such materials are particularly useful in the production of glass fiber-reinforced polyester plastics.

The copolymers of the present invention may be employed as coating compositions, impregnating compositions, as molding compositions, or as part of a thermosetting casting composition for forming molded objects as mentioned above. The polymer solutions prepared by solution polymerization may be directly used with or without dilution with additional solvent for coating or impregnating purposes. Polymers obtained by bulk polymerization or by isolation from the polymerization medium in solution, emulsion, or suspension polymerization may be used directly for extrusion to form films which may be self-supporting or may be applied immediately on extrusion to a substrate to be coated or laminated therewith. Alternatively, such polymers may be dissolved in a solvent or dispersed with the aid of a dispersing agent in a medium within which the polymer is insoluble for application for coating and impregnating purposes.

The copolymers may be applied to various materials for coating and impregnating them, such as paper, leather, wood, glass, metals, either bare or primed, including iron, steel, Monel metal, copper, aluminum, brass, and lead. The copolymers may be applied as coatings on various plastics including poly(methyl methacrylate) copolymers of vinyl acetate and vinyl chloride, polyethylene, polyesters obtained by the condensation of an aliphatic or aromatic dicarboxylic acid (such as phthalic or adipic) with a glycol or other polyol such as ethylene glycol, diethylene glycol, trimethylol ethane, and glycerine. The copolymers are also useful for the pigment-dyeing and printing of textiles, fabric backing coatings such as rug backings, as bonding agents for fibers in non-woven fabrics, and for wool stabilization. Thus, copolymers containing from 5 to 20% by weight of a monomeric compound of the present invention with ethyl acrylate, butyl acrylate, or the like, are useful to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. from a period of one-half to fifteen minutes. The copolymers containing ½ to 5% or even up to 10 or 20% by weight of units derived from a monomer of the present invention are also excellent binders for non-woven fabrics of all types of natural and synthetic fibers or filaments made by the air-deposition, carding, or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. Similar aqueous dispersions made by the emulsion copolymerization of a monomer of the present invention with acrylic esters and especially butyl acrylate or ethyl acrylate are useful, with or without pigment, for the primary coating of leather. In this connection, the heterocyclic group apparently exerts some chemical bonding action with the structure of the leather so as to provide good adhesion. Copolymers with acrylonitrile, especially those containing 75 to 90% of acrylonitrile, with a monomeric compound of the present invention provide useful fiber- and film-forming materials which are adapted to be spun or cast to form fibers and films which are characterized by improved receptivity toward dyes. Copolymers of a monomeric compound of the present invention with acrylic acid or methacrylic acid or copolymers thereof with a vinylpyridine, when included in melts or solutions of polymers of acrylonitrile containing 75 to 90% acrylonitrile, such as copolymers thereof with vinyl chloride, vinyl acetate or the like, serve to modify the dyeing properties of fibers and films formed therefrom.

In all of the applications as coatings and impregnants, the copolymer after drying may be heated to temperatures of 110° C. to 300° C. for a period of time such as one-half hour to one hour at the lower temperature down to about 30 seconds to five minutes at the upper temperature. Such heating converts the copolymer to insoluble and infusible condition rendering the coating or impregnant resistant to solvents and resistant to melting on heating.

Of the various copolymer units of the present invention, the free amic acid units or solutions thereof are outstanding in respect to their capacity to impart adhesion toward various substrates including metals whether bare or primed, glass, plastics, wood, paper, leather, and textiles. Such copolymers are also characterized by outstanding dispersing properties favoring the inclusion of fillers and pigments, in amounts of 0.2 to 15% by weight of the copolymer, in the coating and molding compositions made with the copolymers whether as aqueous dispersions or in organic media. The acid groups in such copolymers are also reacted with epoxy compounds, isocyanates, and acid anhydrides so that coatings, impregnants, and other formed masses made of such copolymers are adapted to be converted to insoluble and infusible condition by reaction with polyepoxides such as alkylene or arylene polyepoxides, including alpha,omega-diepoxyhexane and isopropylidene-bis-phenyl glycidyl ether, with polyisocyanates such as alpha,omega-diisocyanatohexane, diisocyanatophenylmethane, and tolylene diisocyanate, and acid anhydrides such as pyromellitic anhydride. The acid-containing polymers may be converted into the ester derivatives by mixing with diazomethane in the cold.

The acid-containing copolymers of the present invention, because of the outstanding adhesion, are adapted to produce excellent automotive lacquers either for use as primers or topcoats or both, which may be allowed to remain in thermoplastic condition or converted to infusible condition as desired. They are also useful for the production of thermosetting enamels such as enamels for refrigerators, stoves, and other household appliances. For these purposes, they are useful alone or may be mixed with polyepoxy resins or aminoplast resins such as butylated methylol melamines and polyepoxides obtained from bis-phenols such as Bis-phenol A by reaction with epichlorohydrin.

A preferred class of compounds of this invention are the amic-acids derived from anhydrides, particularly maleic, itaconic, chloromaleic, and citraconic. These compounds are readily prepared in high yield and purity from commercially-available intermediates. The compounds are unique in their combination of functionality including carboxyl, amide, cyclic urea, and unsaturation. All of these groups are available for controlled condensation or addition reactions. Although these materials are easily converted to polymers under the particular conditions disclosed in this invention, they are stable over long periods of time even when stored at room temperature. The functionality of these materials after addition polymerization imparts unexpected adhesive properties to the resultant polymers. These polymers are also readily modified by subsequent reaction of these functional groups to give graft, block or insoluble polymers as noted in the description of the invention.

The following examples are illustrative of the invention and the parts and percentages therein are by weight unless otherwise specifically designated.

EXAMPLE 1

(a) A solution of 51.6 parts (0.4 mole) of 1-(2-aminoethyl)imidazolidinone-2 in 200 parts of chloroform is added with stirring at 25° C. over a period of one hour to a solution of 39.2 parts (0.4 mole) of maleic anhydride in 300 parts of chloroform. After three hours the white precipitate is collected by filtraton, washed with 100 parts of chloroform and dried to give 88 grams of product (97% yield) M.P. 178–181° C. (dec.). The sample may be recrystallized from water to give material of M.P. 181–182° C. (dec.). The product contains 18.3% nitrogen and has a neutral equivalent of 225 consistent with 1-[2-(beta-carboxyacrylamido)ethyl]imidazolidinone-2 of the formula

The calculated values are 18.5% N with a neutral equivalent of 227. The product is most probably the cis-isomer.

(b) The process of part (a) is repeated substituting 0.4 mole of chloromaleic anhydride for the maleic anhydride.

EXAMPLE 2

A solution of 0.5 mole of cis-β-carbomethoxy acrylyl chloride in 200 ml. of chloroform is added to a solution of 1.0 mole of 1-(2-aminoethyl)imidazolidinone-2 in 200 ml. of chloroform at 0–5° C. with stirring and care is taken to exclude moisture. The precipitated solids are collected by filtration. The solids are extracted with hot chloroform and the combined chloroform solutions are concentrated to a total volume of 250 m. and cooled. The precipitated product is purified by recrystallization from methylene chloride to give an approximately 40% yield of 1-[2-(β-carbomethoxyacrylamido)ethyl]imidazolidinone-2, M.P. 127–129° C. The product contains 49.9% carbon and 17.5% nitrogen in agreement with the calculated values of 49.8% carbon and 17.4% nitrogen.

EXAMPLE 3

By the procedure of Example 1 equimolar quantities of maleic anhydride and 1-(3-aminopropyl)hexahydro-pyrimidinone-2 are reacted to give an essentially quantitative yield of product corresponding to the formula

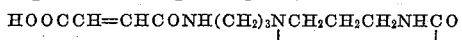

The product is a solid containing 16.3% N with a neutral equivalent of 250. Theory 16.5% N; N.E. 255.

EXAMPLE 4

By the procedure of Example 1 equimolar quantities of itaconic anhydride and 1-(2-aminoethyl)imidazolidinone-2 are reacted to give the corresponding amic-acid, which may be 1-[2-(α-carboxymethylacrylamido)ethyl]-imidazolidinone-2, its isomer, 1-[2-(β-carboxy-β,γ-butenoamido)ethyl] imidazolidinone-2, or a mixture of the two.

The product is a solid containing 15.3% N with a neutral equivalent of 275. Theory, N.E. 269; N 15.6.

EXAMPLE 5

By the procedure of Example 2 a solution of 0.25 mole of the half acid chloride, half ester of fumaric acid (trans-β-carboxymethoxyacrylyl chloride) is added to 0.5 mole of 1-(2-aminoethyl)imidazolidinone-2. The solid product, 1-[2-(β-trans-carbomethoxyacrylamido)ethyl]imidazolidinone-2, an isomer of the product of Example 2, is a solid containing 17.3% N and has the formula

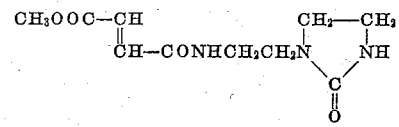

EXAMPLE 6

(a) A suspension of 10.0 grams (0.044 m.) of the product of Example 1 in 50.0 grams of water is treated with 9.0 grams (0.455 m.) of N,N'-dicyclohexyl carbodiimide. The mixture is allowed to stand at room temperature for 16 hours with occasional agitation. The mixture is then heated to 50° to 60° C. for one hour and filtered while still warm. The solid filter cake, byproduct dicyclohexyl urea, after air-drying overnight weighs 10.0 grams—M.P. 213°–216° C. The filtrate is stripped at reduced pressure until only a semi-solid remains. This solid is then slurried with a little acetone and again stripped to dryness. The product, 4.5 grams (45% yield) of a pale yellow solid, has a M.P. of 123°–126° C. (dec.) and is extremely soluble in common organic solvents such as acetone and ethanol. The product, which may be called N-[2-(2-keto,1-imidazolidinyl)ethyl]maleimide or 1-[2-(N-maleimidyl)ethyl]-imidazolidinone-2, contains 20.01% N in good agreement with the calculated value of 20.1% for the substituted maleimide and has the formula

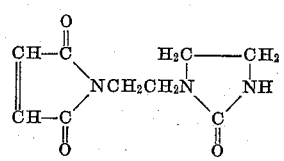

(b) The procedure of part (a) is followed except that the solvent, water, is replaced with chloroform. The yield of light tan product is again 45%, M.P. 120°–125° C. (dec.). The product contains 20.15% nitrogen.

(c) The procedure of part (a) is followed except that the solvent, water, is replaced with tetrahydrofuran. The yield of light tan solid is 55%, M.P. 121°–124° C. (dec.). The product contains 20.05% nitrogen.

EXAMPLE 7

(a) By the procedure of Example 6(c) the product of Example 3 is treated with an equimolar quantity of dicyclohexylcarbodiimide. The product is a tan solid obtained in approximately 50% yield. The nitrogen content of 17.5% is in agreement with that calculated for the product which may be named either 1-[3-(N-maleimido)propyl]hexahydropyrimidinone-2 or N-[3-(2-keto,1-hexahydropyrimidinyl)propyl]maleimide, which has the formula

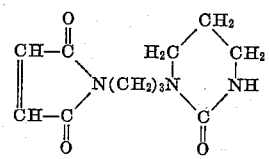

(b) Again by the procedure of Example 6(c), the product of Example 4 is treated with an equimolar quantity of dicyclohexylcarbodiimide. After separation of the dicyclohexylurea, the desired product which may be named either N-[2-(2-keto,1-imidazolidinyl)ethyl]- itaconimide or 1 - [2 - (N - itaconimidyl)ethyl]imidazolidinone-2 is isolated as a tan solid containing 16.9% nitrogen.

EXAMPLE 8

(a) A solution of 950 parts of methyl methacrylate, 50 parts of maleic anhydride, 1500 parts of toluene and 5.1 parts of azobisisobutyronitrile is prepared and sparged with nitrogen. Approximately 600 parts is charged to a flask and heated to 80° C. with stirring in a nitrogen atmosphere. The remainder of the solution is added slowly over a period of two hours after the initial exotherm has subsided. The resultant solution of a copolymer of maleic anhydride and methyl methacrylate has a viscosity of 46 poises at 25° C. and at 39.9% copolymer solids.

(b) In a way similar to that of part (a), a mixture of 640 parts of methyl methacrylate, 262 parts of ethyl acrylate, and 56 parts of itaconic anhydride is converted to a solution of the ternary copolymer with a viscosity of 11 poises at 39.8% copolymer solids and 25° C.

EXAMPLE 9

Table A summarizes in runs C to F, inclusive, the viscosity at 25° C. of the solution of the reaction product obtained by heating, while stirring, a mixture of 1000 parts of the copolymer solution (A) prepared in Example 8(a) with the indicated amount of 1-(2-aminoethyl)imidazolidinone-2 (B) at 100° C. for one hour in an atmosphere of nitrogen.

Table A

| Run | Temp., ° C. | Time, Hrs. | Parts of Cop. A | Parts of Amine B | Molar Ratio, Anhydride/amine | Visc. (Poises) |
| --- | --- | --- | --- | --- | --- | --- |
| C | 100 | 1 | 1,000 | 26.4 | 1 | 46 |
| D | 100 | 1 | 1,000 | 13.2 | 5.0 | 36 |
| E | 100 | 1 | 1,000 | 2.6 | 10.0 | 36 |
| F | 100 | 1 | 1,000 | 52.8 | 0.5 | 46 |
| G | 40–50 | 8 | 1,000 | 26.4 | 1 | 46 |
| H | 40–50 | 8 | 1,000 | 13.2 | 5.0 | 46 |
| I | 40–50 | 8 | 1,000 | 2.6 | 10.0 | 36 |
| J | 40–50 | 8 | 1,000 | 52.8 | 0.5 | 46 |

EXAMPLE 10

A similar series of copolymer resins (runs G–J in Table A) are prepared by effecting the reaction of Example 9 at 40–50° for eight hours. The products have similar properties but are of lighter color.

The products of Table A are solutions of copolymers containing as an integral part of the copolymer varying amounts of the amic-acid corresponding to the product of Example 1 polymerized therein. The products of runs F and J are solutions of copolymers containing as an integral part of the copolymer the 1-(2-aminoethyl)-imidazolidinone-2 salt of the amic-acid corresponding to the product of Example 1 in addition to the free amic-acid itself.

EXAMPLE 11

(a) By the procedure of Example 9 the polymer of Example 8(a) is reacted with 1-(3-aminopropyl)hexahydropyrimidinone-2 using this amine in quantities to provide the same mole ratios between anhydride and amine B as in Example 9, Table A. There is thus obtained a series of copolymers (which may be designated as resins K, L, M, and N, respectively) containing as an integral part of the copolymer polymerized units of the amic-acid corresponding to the product of Example 3.

(b) The polymer of Example 8(a) is replaced with the polymer of Example 8(b) and the reactions are effected as described in Example 9 using the amine of that example at molar ratios of anhydride to amine of 1.0, 5.0, 10.0, and 0.5. The resultant copolymers (which may be designated as resins O, P, Q, and R, respectively) contain the amic-acid of Example 4 as an integral part of the copolymer.

In those runs where amine has been used in molar excess to the anhydride the copolymer contains units of the amine salt of the amic-acid.

EXAMPLE 12

(a) A mixture of 227 parts (1 mole) of 1-[2-($\beta$-carboxyacrylamido)ethyl]imidazolidinone-2, 1000 parts of methanol, and 19 parts (0.1 mole) of p-toluenesulfonic acid monohydrate is refluxed with stirring for 24 hours. The reaction mixture is distilled slowly while 1000 parts of fresh methanol are added to maintain the original level. The reaction mixture is then evaporated to dryness at reduced pressure (about 10 mm. Hg) leaving 242 parts of yellow solid. The residue is extracted with 300 parts of hot methylene chloride; the solution is clarified by filtration and cooled. The product, 1-[2-($\beta$-carbomethoxyacrylamido)ethyl]imidazolidinone-2, crystallizes and is collected by filtration and dried to give 71 parts (30% yield) of solid, M.P. 127°–129° C. Recrystallization from methylene chloride raises the M.P. to 129°–130° C. The product contains 49.97% carbon, 6.53% hydrogen, and 17.22% nitrogen by analysis in good agreement with the calculated values of 49.8% carbon, 6.2% hydrogen, and 17.4% nitrogen. The ester is highly soluble in dimethyl formamide, the monomethyl ether of ethylene glycol, and methanol; the ester is moderately soluble in hot acetone or n-butanol; and slightly soluble in hot methyl methacrylate, ethyl acetate, and toluene.

(b) A mixture of 1 mole of the product of Example 3, 20 moles of n-butanol, and 0.1 mole of p-toluenesulfonic acid monohydrate is refluxed with stirring through a moisture trap (Dean-Stark) for 24 hours. The mixture is allowed to distill slowly until the reflux temperature is constant. The residual butanol and volatiles are removed at reduced pressure (1 to 10 mm. Hg). The residue is dissolved in methylene chloride and the solution washed with cold, dilute sodium bicarbonate solution and then water. The organic solution is dried and concentrated at reduced pressure (e.g., 10 mm. Hg) to give the product, 1-[3-($\beta$-carbobutoxyacrylamido)propyl]hexahydropyrimidinone-2, as a low-melting solid. The product contains 13.4% N in agreement with the calculated value of 13.5% N. The product is readily soluble in organic solvents such as chloroform, monomethyl ether of ethylene glycol, and ethanol.

EXAMPLE 13

A solution is prepared consisting of 12 parts of 1-[2-($\beta$-carbomethoxyacrylamido)ethyl]imidazolidinone-2, 585.5 parts of methyl methacrylate, 2.5 parts of methacrylic acid, 1.5 parts of benzoyl peroxide, 60 parts of methyl Cellosolve and 432 parts of toluene. Two hundred parts of this solution is charged to a flask and heated with stirring in a nitrogen atmosphere to 100° C. After the initial heat evolution has subsided (approximately 30 minutes) the remainder of the charge is added in a period of two hours with the pot temperature maintained at 100° C. The mixture is recatalyzed after 3 and 5 hours with 0.5 part of benzoyl peroxide and 908 parts of toluene are added over a period of 9 hours at 110° C. starting with the first recatalysis. The resultant polymer solution is clear and contains 29.1% solids with a viscosity at 25° C. of 3.3 poises, a conversion of 97%. A portion of the polymer, precipitated with methanol, washed well and dried contains 0.45% nitrogen indicating that essentially quantitative copolymerization of the imidazolidinone has occurred. Films cast from this solution on bare or primed metal, air-dried and baked at 300° F. for 30 minutes were hard and glossy.

EXAMPLE 14

Automotive steel panels are coated with a standard baking primer comprising essentially a red iron oxide-pigmented binder formed of a coreacted mixture of a urea-formaldehyde resin with an epoxide of the isopropylidene-bis-phenol/epichlorohydrin condensate type and baked for 45 minutes at 300° F. The panels are then topcoated by spraying with lacquers formed of various of the copolymer solutions of Examples 9, 10, and 11, and a control copolymer solution to each of which there are added butyl benzyl phthalate as a plasticizer (percentage in Table B based on weight of copolymer) and 30 parts of a pigment per 70 parts of copolymer. The pigment is composed of a mixture of 99 parts of titanium dioxide (rutile type) and 1 part of lampblack. The control resin solution is a 30% solution of a copolymer of methyl methacrylate and 0.5% by weight of methacrylic acid in ethoxyethyl acetate having a viscosity of 6.2 poises at 25° C. All of the lacquers had No. 4 Ford cup viscosities at 25° C. of 12 seconds at the solids level applied in topcoating which is indicated in Table B. The topcoat is baked at 180° F. for 30 minutes. Adhesion is determined by scoring the panel with an X-shaped mark and applying transparent pressure-sensitive adhesive tape (Scotch tape) to the scored area, pressing it firmly by rubbing with a rubber pencil eraser. The tape is then removed by lifting while pulling in a direction parallel to the plane of the surface so that the tape makes as it leaves the surface, a small acute angle on the order of 15°. Table B lists under "Adhesion" the degree of topcoat failure which is rated from 1 (no failure) to 10 (severe failure) as measured as an area of failure in all four quadrants of the scored panel.

Table B

| Resin | Adhesion | Percent Plasticizer | Solids |
| --- | --- | --- | --- |
| Control | 8.0 | 30 | 13.4 |
| Example 9, Run C | 1.7 | 30 | 15.0 |
| Example 9, Run D | 2.0 | 30 | 15.2 |
| Example 9, Run E | 2.2 | 30 | 14.8 |
| Example 9, Run F | 3.0 | 30 | 15.0 |
| Example 10, Run G | 1.8 | 30 | 15.1 |
| Example 11, Run K | 2.0 | 30 | 16.0 |
| Example 11, Run O | 2.2 |  | 16.5 |
| Example 11, Run O | 1.8 | 10 | 16.3 |

EXAMPLE 15

Steel panels are coated using a 5-mil film caster with the polymer solutions indicated below adjusted to 30% solids. The solutions contain no plasticizers or pigments. The films are air-dried and then baked for 30 minutes at the indicated temperature. Pencil hardness (Kohinoor) and knife adhesion are indicated.

Table C

| Resin | Bake Temp. (° F.) | Pencil Hardness | Knife Adhesion |
| --- | --- | --- | --- |
| Control I | 300 | 2H | Poor. |
| Control II | 300 | HB | Poor. |
| Example 9, Run C | 300 | 4H | Good. |
| Example 11, Run O | 300 | 3H | Excellent. |
| Example 11, Run O | 180 | 2H | Good. |
| Control II | 180 | HB | Poor. |

Control Resin I is the 30% methyl methacrylate copolymer solution described in Example 14. Control Resin II is a copolymer of methyl methacrylate, ethyl acrylate, and methacrylic acid (weight percent, 69.5/30/0.5) at 25° C. and 30% solids in toluene with a viscosity of 17.5 poises.

NOTE.—300° F. is a standard appliance bake for thermosetting films of enamel type coatings; 180° F. is a mild bake for lacquer type coatings.

EXAMPLE 16

A copolymer is prepared by mixing 2 parts of the product of Example 1, 50 parts of the monomethyl ether of ethylene glycol, 98 parts of methyl methacrylate, 100 parts of ethoxyethyl acetate, and 0.5 part of azobis- isobutyronitrile, and heating the mixture to 80° C. with stirring. The temperature is controlled by cooling and the addition of 80.0 parts of ethoxyethyl acetate. The resultant copolymer solution contains 29.8% solids and has a viscosity at 25° C. of 5.5 poises.

The copolymer resin solution is applied to steel panels with a 5-mil film-caster. The air-dried panels are baked at 300° for 30 minutes. The resultant films are hard, clear, glossy, and have good knife adhesion and a pencil hardness of 4H. The coating is thermoplastic at temperatures above 250° F. and is soluble in ethoxyethyl acetate.

EXAMPLE 17

(a) The resin solution of Example 16, 100 parts, is admixed with 6 parts by weight of 1,3-bis-methoxymethyl-imidazolidinone-2 and 0.3 part of maleic acid. The resin is applied to steel panels with a 5-mil film-caster and the air-dried panels baked at 300° F. for 30 minutes. The resultant coatings have a pencil hardness of 6H to 8H and excellent adhesion. The coating is not thermoplastic and is insoluble in ethoxyethyl acetate.

(b) The resin of Example 9, run C, 100 parts, is similarly mixed as in part (a) above and coated on steel panels. The baked films have excellent adhesion, and are insoluble and infusible.

It is to be understood that changes and variations may be made without departing from the spirit and scope of the invention as defined in the appended claims.

We claim:

1. As a new composition of matter, a compound selected from the group consisting of (1) N-substituted amic acids selected from the group consisting of maleamic acid, chloromaleamic acid, fumaramic acid, itaconamic acid, and citraconamic acid, in which the nitrogen atom of the amic acid is directly connected to a group of the formula

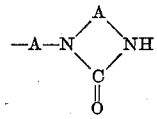

wherein A is an alkylene group having two to three carbon atoms and having at least two carbon atoms extending in a chain between the adjoined N atoms, (2) the cyclic imide of each of the aforesaid N-substituted amic acids, and (3) the esters of the aforesaid N-substituted amic acids with an alkanol having one to four carbon atoms.

2. An addition copolymer of a compound of claim 1 with a copolymerizable compound containing at least one ethylenically unsaturated group of the formula $CH_2=C=$.

3. A compound of the formula

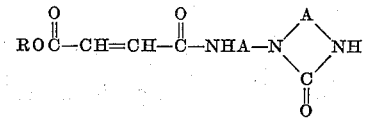

(II)

where R is selected from the group consisting of H and alkyl having one to four carbon atoms, A is an alkylene group having two to three carbon atoms and having at least two carbon atoms extending in a chain between the adjoined N atoms.

4. An addition copolymer of a compound of claim 3 with a copolymerizable compound containing at least one ethylenically unsaturated group of the formula $CH_2=C=$.

5. An addition copolymer of a compound of claim 3 with an ester of the formula

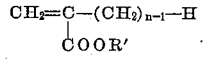

where $n$ is an integer having a value of one to two and R' is an alkyl group having one to eighteen carbon atoms.

6. An addition copolymer of a compound of claim 3 with methyl methacrylate.

7. A compound of the formula

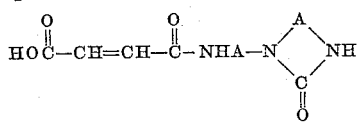

where A is an alkylene group having two to three carbon atoms, and having at least two carbon atoms extending in a chain between the adjoined N atoms.

8. An addition copolymer of a compound of claim 7 with a copolymerizable compound containing at least one ethylenically unsaturated group of the formula $CH_2=C=$.

9. An addition copolymer of a compound of claim 7 with an ester of the formula

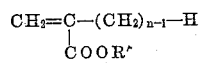

where $n$ is an integer having a value of one to two and R' is an alkyl group having one to eighteen carbon atoms.

10. An addition copolymer of a compound of claim 7 with methyl methacrylate.

11. A compound of the formula

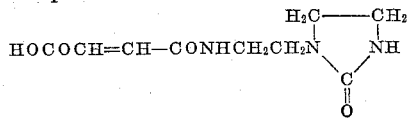

12. An addition copolymer of a compound of claim 11 with a copolymerizable compound containing at least one ethylenically unsaturated group of the formula $$CH_2=C=$$

13. An addition copolymer of a compound of claim 11 with an ester of the formula

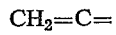

where $n$ is an integer having a value of one to two and R' is an alkyl group having one to eighteen carbon atoms.

14. An addition copolymer of a compound of claim 11 with methyl methacrylate.

15. A compound of the formula

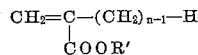

where A is an alkylene group having two to three carbon atoms, and having at least two carbon atoms extending in a chain between the adjoined N atoms.

16. The method comprising reacting an anhydride selected from the group consisting of maleic, chloromaleic, itaconic, and citraconic anhydrides with an amine of the formula

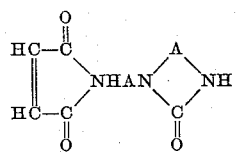

in which A is an alkylene group having two to three carbon atoms and having at least two carbon atoms extending in a chain between the adjoined N atoms, the reaction being effected in an inert solvent at a temperature from room temperature to about 60° C., and recovering the resulting amic acid in which the nitrogen is substituted by the group

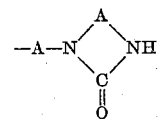

17. The method which comprises reacting an addition copolymer of an anhydride selected from the group consisting of maleic, itaconic and citraconic anhydrides and at least one other copolymerizable compound containing at least one ethylenically unsaturated group of the formula $H_2C=C=$ with an amine of the formula

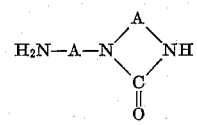

in which A is an alkylene group having two to three carbon atoms and having at least two carbon atoms extending in a chain between the adjoined N atoms, the reaction being effected in an inert solvent at a temperature from about 40° to about 110° C., and recovering a polymeric amic acid in which the nitrogen atom of amic acid units is substituted by the group

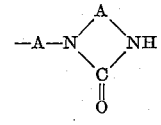

18. The method which comprises reacting a compound of the formula

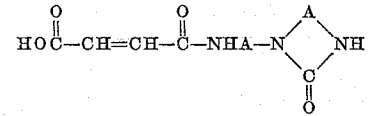

in which the groups are in the cis-position about the carbon-carbon double bond with a dialkyl carbo-diimide and recovering a compound of the formula

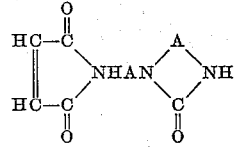

where A is an alklyene group having two to three carbon atoms, and having at least two carbon atoms extending in a chain between the adjoined N atoms.

No references cited.